United States Patent [19]

Van Dyck et al.

[11] E Re. 30,618

[45] Reissued May 19, 1981

[54] COLLAPSIBLE PORTABLE ELECTRIC HAIR CURLING IRON

[75] Inventors: Kenneth A. Van Dyck; James B. Wyatt, both of Westport; Charles F. Stephenson, Rowayton; Scott W. Miller, Stratford, all of Conn.

[73] Assignee: The Gillette Company, Boston, Mass.

[21] Appl. No.: 17,338

[22] Filed: Mar. 5, 1979

Related U.S. Patent Documents

Reissue of:

[64] Patent No.: 4,101,757
Issued: Jul. 18, 1978
Appl. No.: 703,581
Filed: Jul. 8, 1976

[51] Int. Cl.[3] ..... A45D 1/04; H05B 3/06; H01R 11/02

[52] U.S. Cl. ..... 219/225; 132/37 A; 219/227; 219/230; 219/533; 339/34; 339/58

[58] Field of Search ..... 219/221-242, 219/533; 132/31 R, 31 A, 32 R, 32 A, 33 R, 34 R, 37 R, 37 A; 320/2; 339/34-36, 58, 108

[56] References Cited

U.S. PATENT DOCUMENTS

| | | | |
|---|---|---|---|
| 943,483 | 12/1909 | Stevens | 219/257 |
| 996,821 | 7/1911 | Wulff | 132/37 A |
| 1,010,891 | 12/1911 | Gamble | 219/231 |
| 1,275,552 | 8/1918 | Griesel | 219/257 X |
| 1,393,888 | 10/1921 | Farnsworth | 219/270 |
| 1,485,193 | 2/1924 | McKay | 339/34 |
| 2,056,951 | 10/1936 | Bohall et al. | 219/227 |
| 2,066,328 | 1/1937 | Cameron | 339/34 X |
| 2,134,462 | 10/1938 | Powell | 219/262 |
| 2,406,490 | 8/1946 | Day | 219/222 |
| 3,027,507 | 3/1962 | Hubner | 320/2 |
| 3,212,188 | 10/1965 | Riley et al. | 30/216 |
| 3,277,271 | 10/1966 | Hunt | 219/267 X |
| 3,458,794 | 7/1969 | Bohmstedt et al. | 339/34 X |
| 3,519,914 | 7/1970 | Fujimaki et al. | 320/2 |
| 3,534,392 | 10/1970 | Trouilhet | 219/225 |
| 3,581,056 | 5/1971 | Djenner | 219/222 |
| 3,644,873 | 2/1972 | Dalton et al. | 320/2 X |
| 3,760,149 | 9/1973 | Harsanyl | 219/247 |
| 3,917,372 | 11/1975 | Selinko | 339/75 M |
| 3,971,609 | 7/1976 | Knecht | 339/14 P |
| 4,001,803 | 1/1977 | Lombardo | 339/34 |
| 4,086,523 | 4/1978 | Izumi | 320/2 |

FOREIGN PATENT DOCUMENTS

| | | | |
|---|---|---|---|
| 2246773 | 9/1972 | Fed. Rep. of Germany | 219/225 |
| 1150200 | 8/1957 | France | 219/229 |
| 1375768 | 11/1974 | United Kingdom | 219/225 |

*Primary Examiner*—A. Bartis
*Attorney, Agent, or Firm*—Richard A. Wise; Raymond J. De Vellis

[57] ABSTRACT

A portable electric curling iron has a hollow handle having an open end. An electrically heated hair curling member is arranged for telescopic movement between a retracted storage position within the handle and an extended use position wherein the member projects from the handle through the open end thereof. Movable electrical connector plug means are provided on the iron for connecting the electric heating means associated with the hair curling member to a power source. Means are provided for automatically moving the connector plug means between a retracted plug position wherein the plug means is substantially entirely within the handle and an extended plug position wherein the plug projects from the handle in response to the telescopic movement of the hair curling member into and out of the handle.

26 Claims, 10 Drawing Figures

COLLAPSIBLE PORTABLE ELECTRIC HAIR CURLING IRON

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to hair curling irons and, more particularly, to curling irons having a heat conducting member and plug which withdraw into a curling iron handle.

2. Description of the Prior Art

Apparatus for curling hair comprising a tubular heat conducting member and a conformably shaped compressive gripping element extending from one end of a handle and a plug connected to an electrical cord extending from an opposite end of the handle are well known in the prior art. An external surface of the tubular member is heated to a temperature suitable for curling hair by a heating element in thermal contact with the tubular member. A tress of hair is held against the tubular member by the compressive gripping element and then wrapped around the gripping element and the tubular member so that heat from the tubular member can cause the hair tress to adopt the shape of the tubular member.

At times, a user may wish to carry the curling iron in a pocket or purse to a place outside of the home. The length of the conventional curling iron consisting of the handle and the tubular member projecting from one end of the handle could exceed more than 30 cm. It will be appreciated that a long curling iron in combination with a cumbersome cord, which tends to become tangled and twisted, presents an inconvenient package for easy transportation. An attempt to reduce the length of the curling iron by telescoping the tubular member into the handle is disclosed in German Pat. No. 2,246,273 published Mar. 8, 1973 entitled "Curling Iron", and standing in the name of Sadao Shimizo, Tokyo, Japan. However, the prior art does not disclose a portable curling iron having a plug and tubular member arranged to withdraw into a curling iron handle, thus eliminating the need for a cumbersome cord and providing a convenient package for carrying in a purse or pocket.

Accordingly, a hair curling iron is disclosed in which a cord does not extend from the curling iron and both the plug and tubular member withdraw into the curling iron handle.

SUMMARY OF THE INVENTION

A hair curling iron comprises a hollow heat conducting handle and means secured in the handle to telescopically move between a first position projecting from the handle and a second position within the handle. An electric heat generating element is coupled to the heat conducting means for heating the heat conducting means. Plug means are electrically connected to the heat generating element and attached to the heat conducting means with bearing means projecting from the plug means to cooperate with the handle to move the plug means with the heat conducting means between a first plug position projecting from the handle for conducting electrical energy to the heat generating element, and a second plug position substantially entirely within the handle.

These and other features and advantages of the invention will be better understood from a consideration of the following specification taken in conjunction with the accompanying drawing.

DESCRIPTION OF THE PREFERRED EMBODIMENT

Figure 1:
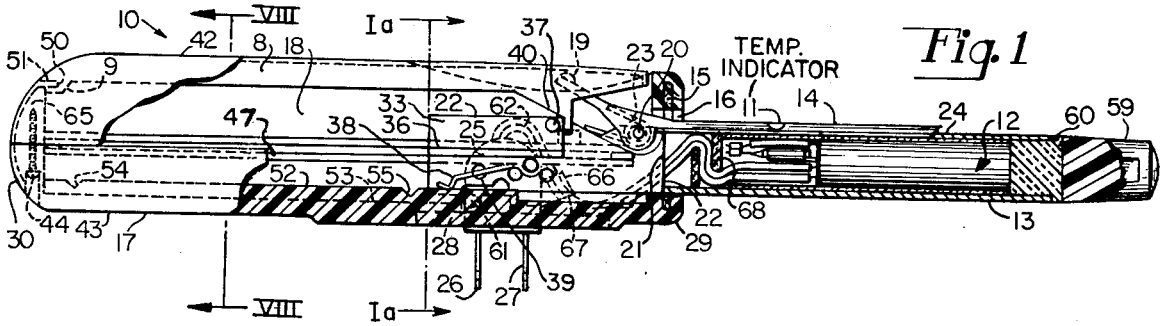
FIG. 1 is a longitudinal view, partially in section, of a preferred embodiment of a hair curling iron in a position to be plugged into a source of power for heating the curling iron preparatory to use.
Figure 2:
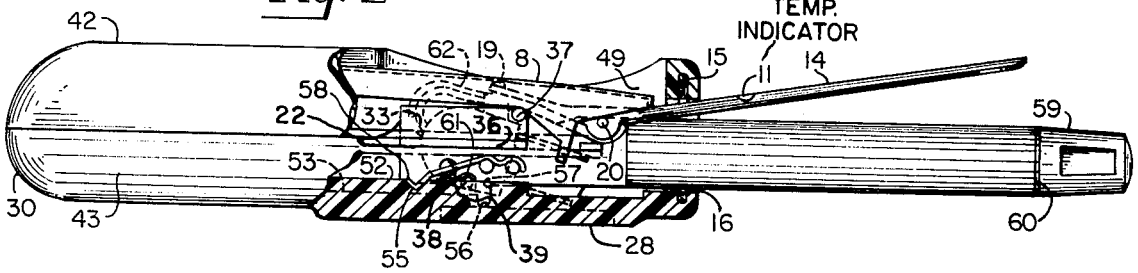
FIGS. 2 and 3 are longitudinal views, partially in section, of the hair curling iron with a hair clip in an open position and a plug retracted into a handle cavity after the curling iron has been heated and disconnected.
Figure 4:
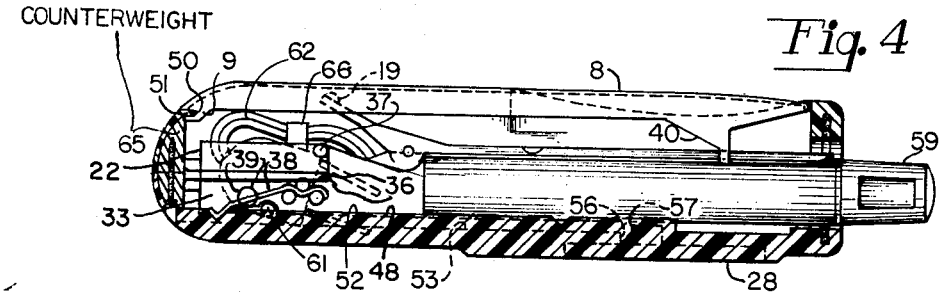
FIG. 4 is a longitudinal view, in section, of the hair curling iron in a compact storage position.
Figure 7:
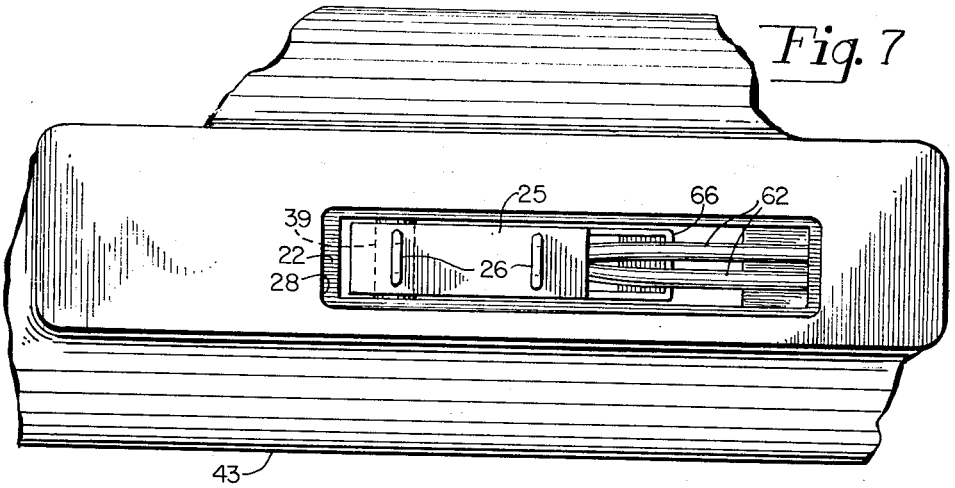
FIG. 7 is a bottom view of a curling iron.
Figure 8:
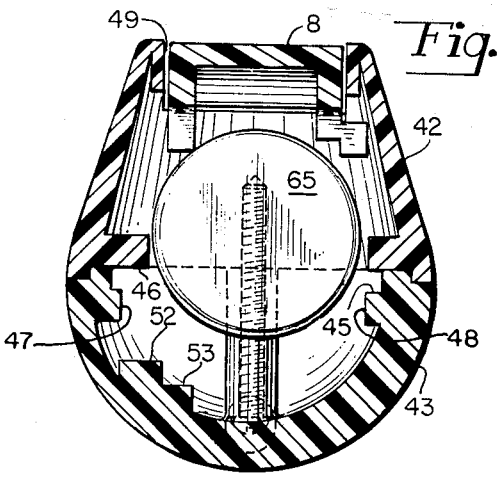
FIG. 8 is a cross-section of FIG. 1 taken along lines VIII—VIII.

Referring to FIG. 1, there is shown a longitudinal view, partially in section, of a preferred embodiment of a curling iron 10 having a heating element 12 disposed within a tubular heat conducting member 13. The tubular member 13 and a conformably-shaped hair clip 14 extend through a center ring 15 and an opening 16 in a molded thermoplastic handle 17. The hair clip 14 and the tubular member 13 are connected to an end 21 of a guide assembly 22. The guide assembly 22 is movably mounted within a handle cavity 18 to permit the hair clip 14 and tubular member 13 to telescopably withdraw into the cavity 18. The hair clip 14 is pivotally connected to the guide assembly 22 by a pivot pin 20 and is normally biased by a spring 23 to be in a closed position in thermal contact with a tubular member external surface 24. A plug 25 or male fitting for making an electrical connection to a receptacle is pivotally mounted on the guide assembly 22. First and second electrical conductor portions 26 and 27 of the plug 25 may project from the handle 17 through an opening 28 intermediate front and rear handle ends 29 and 30, respectively. As shown in FIGS. 1 and 7, the curling iron is in a position to be plugged into a source of power for heating the iron preparatory to use. Unlike prior art curling irons, the tubular member 13 and plug 25 are arranged to withdraw into the handle cavity 18 by pushing the tubular member 13 into the handle cavity 18 to provide a more convenient package for carrying in a pocket or purse, as shown in FIG. 4. In addition, the curling iron 10 is designed so that the plug 25 fully retracts into the handle cavity 18 when an actuator arm 8 having an end 9 attached to the handle rear end 30 is depressed to overcome the bias of the spring 23 causing the hair clip 14 to pivotally move to an open position as shown in FIG. 2.

Figure 1A:
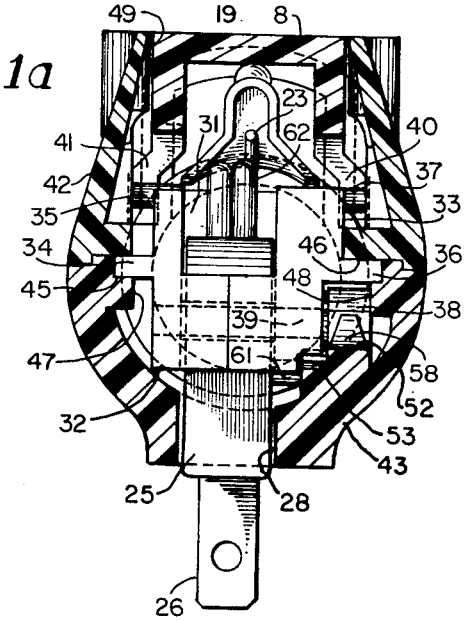
FIG. 1A is a cross-section of FIG. 1 taken along lines 1a—1a showing an end view of a guide assembly.

Referring to FIG. 1A, there is shown a cross-section of FIG. 1 taken along lines 1a—1a showing an end view of the guide assembly 22 formed to provide an opening 31 between guide assembly sides 32 and 33. A rail member 34 and a bearing surface 35 project from an external surface of the side 32. A rail member 36, a bearing surface 37, and a leaf spring 38 project from an external surface of the side 33. The plug 25 is pivotally mounted to the guide assembly 22 between the sides 32 and 33 by a pivot pin 39 so as to permit a pivotal movement of the plug 25 in the guide assembly opening 31. When the tubular member 13 is fully extended, as shown in FIG. 1, a first cam member 40 with a linearly sloping surface on the actuator arm 8 is in contact with the bearing surface 37 and a second cam member 41 with a linearly sloping surface on the actuator arm 8 is in contact with the bearing surface 35.

Referring generally to FIGS. 1, 1A, and 2 and 8, the handle 17 includes a concave top handle half 42 connected to a concave bottom handle half 43 by suitable connecting means, such as screws 44, to form the handle opening 16 and the handle cavity 18. Grooves 45 and 46 are provided on opposite internal cavity walls 47 and 48. The grooves 45 and 46 are aligned relative to each other to receive the guide assembly rail members 34 and 36 so that the guide assemby 22 may reciprocally move forwardly and rearwardly within the handle cavity 18. The top handle half 42 is formed to have an opening 49 through which the actuator arm 8 may be depressed. The actuator arm 8 is attached to the top handle half 42 by coupling a groove 50 in the actuator arm end 29 to a lip 51 on the top handle half 42 near the handle rear end 30. An upraised end 19 of the clip 14 is normally in contact with the actuator arm 8 to force edges of the actuator arm 8 against an internal surface of the top handle half 42.

The bottom handle half 43 is formed to provide the handle opening 28 and upper and lower grooved guide rails, 52 and 53, projecting from the internal cavity wall 48. The upper guide rail 52 has a first detent 54 near the handle rear end 30 and a second detent 55 near the handle opening 28. The lower guide rail 53 has a detent 56 and a stop wall 57 near the handle opening 28. The leaf spring 38 has a V-shaped end 58 which is in friction contact with the upper guide rail 52. The detents 54 and 55 in the upper guide rail 52 and the V-shaped end 58 of the leaf spring 38 provide means for retaining the tubular member 13 in a desired position. For example, if the tubular member 13 is pushed rearwardly or fully compressed into the handle cavity 18, the V-shaped end 58 of the leaf spring 38 moves into the first groove 54 to temporarily retain the tubular member 13 and plug 25 in the compact position shown in FIG. 4.

Figure 5:
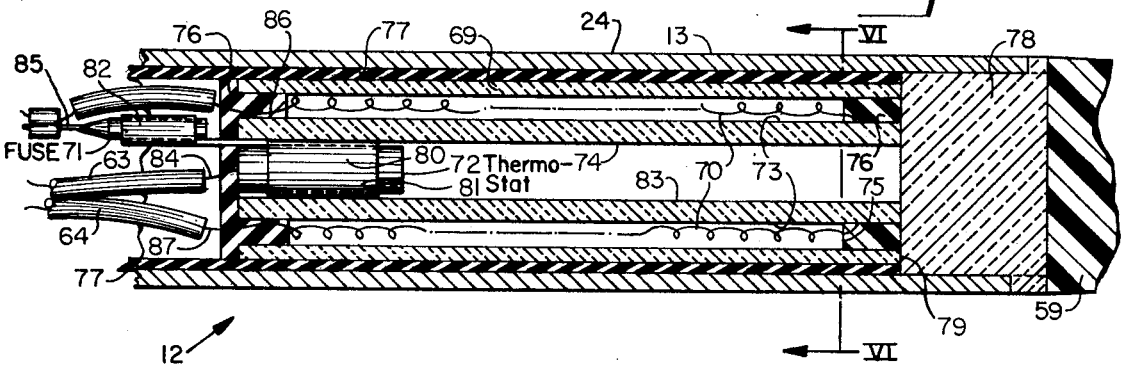
FIG. 5 is a longitudinal view, in section, of a heating assembly.
Figure 6:
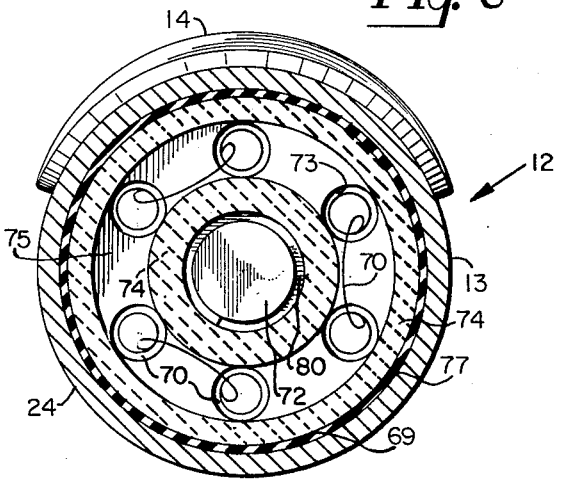
FIG. 6 is a cross-section of the heating assembly.
Figure 9:
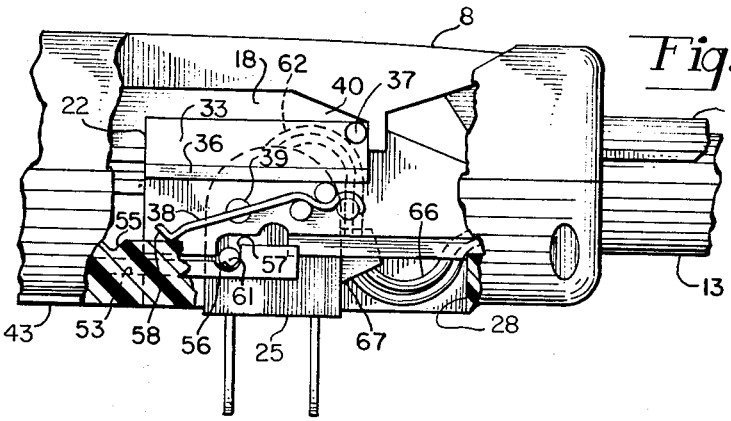
FIG. 9 is a longitudinal view, partially in section, of the curling iron showing the plug projecting from the handle.

The curling iron 10 is ready to receive electrical energy when a thermally insulated tip 59 attached to a tubular member end 60 is manually pulled forwardly until a bearing pin 61 projecting outwardly from the plug 25 is moved against the stop wall 57 on the lower rail 53 to stop the forward motion of the guide assembly 22. The forwardly directed pulling force on the insulated tip 59 is continued until the bearing pin 61 drops into the detent 56 and the plug 25 pivotally moves so that the plug conductor portions 26 and 27 extend through the handle opening 28 as shown in FIG. 9. An electrical cable 62 provides a first and second conductive paths 63 and 64 between the plug conductor portions 26 and 27 and the heating element 12 coaxially disposed within the tubular member 13. A counterweight 65 is disposed within the handle cavity 18 at the handle rear end 30 so that the curling iron center of gravity is located substantially at the handle opening 28 when the curling member 13 is fully extended. The heating element 12, described below and shown in further detail in FIGS. 5 and 6, is arranged to convert electrical energy to sufficient thermal energy for causing the surface temperature of the tubular member external surface 24 to increase to a predetermined level suitable for curling hair. Means for indicating a desired hair curling temperature include a suitable temperature sensitive disk 11 which changes color from red to black at 130° C. The disk 11 is visually displayed on the surface of the hair clip 14. When the disk changes color, the surface temperature of the tubular member 13 is suitable for curling hair and the plug 25 may be disconnected from the wall outlet.

Figure 3:
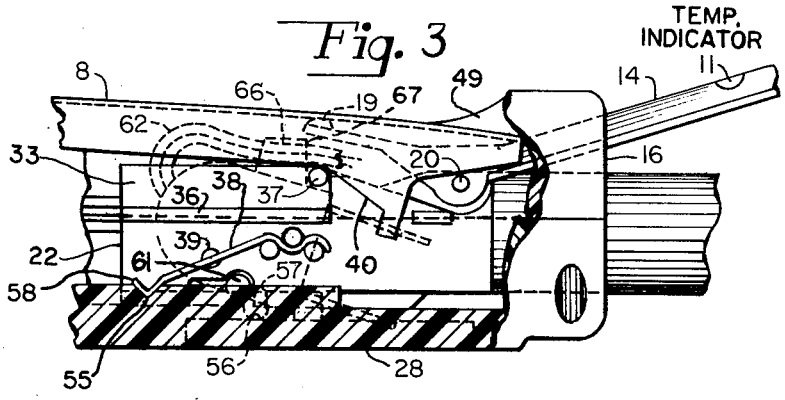

Referring to FIGS. 2 and 3, there is shown a longitudinal view, partially in section, of the curling iron when the actuator arm 8 is depressed to contact the upraised end 19 of the hair clip 14 causing the hair clip 14 to pivotally move to an open position after the curling iron has been heated and disconnected from the power source. The cam members 40 and 41 on the depressed actuator arm 8 have linearly sloping surfaces which move against the projecting bearing surfaces 35 and 37 on the guide assembly 22 to cause the bearing pin 61 to move in an upward direction from the detent 56 and the plug 25 to pivotally move about pin 39, whereby further depression of the actuator arm 8 causes the tubular member 13 and guide assembly 22 to move rearwardly until the leaf spring end 58 moves into the second detent 55 and the plug 25 fully retracts into the handle cavity 18. A tress of hair may be inserted between the raised clip 14 and then clamped against the tubular member external surface 24 when pressure on the actuator arm 8 is relieved and a bias force provided by the spring 23 causes the clip 14 to return to its normal closed position. The curling iron 10 is rotated about its longitudinal axis to wind the clamped tress of hair around the heated hair clip 14 and tubular member 13. The tress of hair is plasticized by the heated surfaces of the hair clip 14 and tubular member 13 causing the hair tress to adopt the shape of the tubular member 13 and become curled. Several tresses of hair may be curled in this manner until heat stored in the tubular member 13 and heating element 12 is finally dissipated. The curling iron 10 may be placed in a ready condition for reheating the tubular member 13 by simply grasping the thermally insulated tip 59 and manually pulling the tubular member 13 forwardly from the handle cavity 18 until the plug conductor portions 26 and 27 once more extend through the handle opening 28.

It will be appreciated that pivotal and translational movement of the plug 25 and cable 62 could cause a cable stress that might lead to a cable break or failure. A cable guide member 66 in the form of a tube is molded or attached to an external surface of the plug 25 to provide means for minimizing stress on the cable 62 and a possibility of the cable 62 becoming pinched as it is moved forwardly and rearwardly within the cavity 18. The cable 62 is disposed within the tubular cable guide member 66 with cable conductors 63 and 64 appropriately connected to provide a current conducting path between the plug conductors 26 and 27 and the heating element 12. The cable guide member 66 secures the cable 62 against the plug 25 and provides controlled cable flexing between an end 67 of the relief member 66 and a cable fastener 68. The cable fastener 68 comprises a plurality of structural ribs arranged within the tubular member 13 to substantially prevent movement of a secured portion of the cable.

Referring to FIGS. 5 and 6, there is shown a broken section and a cross-section of the electrical heating element 12 including a tubelike core 69, resistance wire 70, fuse member 71 and thermostat 72. The core 69 is an open-ended cylinder formed from heat conducting and electrically insulating material, such as ceramic, with a bore suitable for receiving the thermostat 72. The resistance wire 70 is disposed within a plurality of holes 73 extending longitudinally in a core wall 74 and in a circular recess 75 at each end of the core 69. Heat is generated by the resistance wire 70 in response to the application of electric power thereto from a power source and the core 69 provides a thermal path between the resistance wire 70, the thermostat 72 and the tubular member 13. To protect the resistance wire 70 from possible short circuits and moisture, the recess 75 at each end of the core 69 is sealed by a ring 76 of high temperature, moisture resistant material, such as silicone rubber. A thin film 77 of electrically insulating material surrounding the core 69 prevents electrical arcing between the resistance wire 70 and the tubular member 13 if the core 69 is cracked or otherwise damaged and current is being conducted by the resistance wire 70. A thermal and electrical insulator 78, such as mica, is inserted in the tubular member 13 between an end 79 of the core 69 and the curling iron tip 59 to minimize heat conduction from the core to the tip 59, and to hold the core 69 in position.

A metallic heat conducting clamp 80 having a first section 81 surrounding the thermostat 72 and a second section 82 surrounding the fuse 71 provides a serial electrical connection between an external surface or first electrical terminal of the thermostat 72 to an external surface or first electrical terminal of the fuse 71. The first clamp section 81 and the thermostat 72 are disposed within the core 69 in friction contact with an internal core wall 74. A second terminal 84 of the thermostat 72 is electrically connected to the plug electrical conductor 27 via the cable conductor 63. A second electrical terminal 85 of the fuse 71 is electrically connected to a first end 86 of the resistance wire 70. A second end 87 of the resistance wire 70 is electrically connected to the plug electrical conductor 26 via the cable conductor 64. Thus, the fuse 71 and thermostat 72 are serially connected between the plug electrical conductor 27 and the first resistance wire end 86.

The thermostat 72 is arranged, as known in the art, to conduct current to the resistance wire 70 when the temperature of the tubular member external surface 24 is below a predetermined level and to temporarily interrupt current conduction to the resistance wire 70 when the temperature of the tubular member external surface 24 exceeds the predetermined level. An example of the thermostat 72 is a conventional temperature sensitive bi-metallic switch having a pair of points, not shown, normally in contact with each other. The points open or draw apart when a bi-metallic element, not shown, senses a temperature exceeding a critical level. The fuse 71 is a conventional device which disrupts current conduction to the resistance wire 70 in the event the thermostat 72 should fail to operate when the temperature of the tubular member external surface 24 exceeds the predetermined temperature level.

One embodiment of the invention has been shown and described by way of example only. Various other embodiments and modifications thereof will be apparent to those skilled in the art, and will fall within the scope of the invention as defined in the following claims.

What is claimed as new and desired to be secured by Letters Patent of the United States is:

1. A curling iron comprising:

a hollow handle having an open end;

heat conducting means arranged in said handle for telescopic movement therein between a first position projecting from said *open end of said* handle and a second position substantially enclosed within said handle;

an electric heat generating element associated with said heat conducting means for heating said heat conducting means; and electrical connector plug means *in said handle, said plug means being* electrically connected to said heat generating element and adapted to connect said heat generating element to an external source of power, said plug means being coupled to said heat conducting means for movement therewith and having bearing means projecting from said plug means for cooperating with means on said handle [for] *, said bearing means* moving said plug means between a first plug position projecting from said handle for [conducting electrical energy to said heat generating element] *connection to an external power source* when said heat conducting means is in said first position and a second plug position substantially entirely within said handle when said heat conducting means is in said second position in response to movement of said heat conducting means between said first and second positions.

2. A curling iron according to claim 1, wherein said heat conducting means includes a metallic tube and said heat generating element is internally disposed within said tube.

3. A curling iron according to claim 2, wherein said heat conducting means further includes guide means having said plug means pivotally connected thereto and an end of said guide means fixedly attached to said metallic tube, said guide means being disposed within said handle to move along a linear path to permit said heat conducting means to telescope into said handle.

4. A curling iron according to claim 3, wherein said guide means further includes guide rails adapted to cooperate with grooves in said handle to guide said heat conducting means as it telescopes into said handle.

5. A curling iron according to claim 1, further including hair gripping means longitudinally extending along said heat conducting means, said hair gripping means being arranged to telescope within said handle together with said heat conducting means.

6. A curling iron according to claim 1, wherein said means on said handle cooperating with said bearing means projecting from said plug means comprises detent means on said handle.

7. A curling iron comprising:

a hollow handle having an open end;

a heat conducting member arranged in said handle for telescopic movement between a first position projecting from said open end of said handle and a second position substantially enclosed within said handle;

an electric heat generating element associated with said heat conducting member for heating said heat conducting member; and electrical connector plug means *in said handle, said plug means being* electrically connected to said heat generating element and adapted to connect said heat generating element to [a] *an external* source of power, said plug means being coupled to said heat conducting member for movement therewith and having means cooperating with means on said handle for moving said plug means between a first plug position projecting from said handle *for connection to an external power source* when said heat conducting member is in said first position and a second plug position substantially entirely within said handle *when said heat conducting member is in said second position* in response to movement of said heat conducting member between said first and second positions.

8. A curling iron according to claim 7, further comprising:

guide means coupled to said plug means and said heat conducting member, said guide means cooperating with means on said handle for guiding said heat conducting member between said first and second positions;

hair gripping means pivotally connected to said guide means and longitudinally extending along said heat conducting member, said hair gripping means arranged for telescopic movement into said handle together with said heat conducting member; and an actuator member attached to said handle for pivotally moving said gripping means when pressed, said actuator member having a cam surface for pressing against bearing means projecting from said guide means to move said guide means to cause said plug means to withdraw substantially entirely within said handle when said actuator member is pressed.

9. A curling iron according to claim 8, wherein said guide means includes guide rails and an end of said guide means fixedly attached to said heat conducting member, said guide means being disposed within said handle with said guide rails cooperating with grooves in said hollow handle to guide said heat conducting member as it telescopes into said handle.

10. A curling iron according to claim 7, wherein said heat conducting member is a tube and said heat generating element is internally disposed within said tube.

11. A curling iron according to claim 7, wherein said cooperating means on said plug means and handle include an outwardly projecting bearing pin on said plug means adapted to cooperate with a detent within said hollow handle to move said plug means between said first and second plug positions in response to movement of said heat conducting member between its first and second positions.

12. A curling iron comprising:

a hollow handle having an open end;

a heat conducting member secured to said handle and arranged for reciprocal movement between a retracted position wherein said heat conducting member is substantially entirely enclosed within said handle and an extended position wherein said heat conducting member projects from said handle through said open end;

an electrical heat generating element associated with said heat conducting member for heating said heat conducting member;

electrical plug means *in said handle, said plug means being* electrically connected to said heat generating element and adapted to connect said heat generating element to [a] *an external* source of electric power, said plug means being arranged for movement between a position projecting from said handle *for connection to an external power source* and a position retracted *substantially entirely* within said handle, said plug means being arranged to project from said handle when said heat conducting member projects from said handle; and means for automatically retracting said projecting plug means substantially entirely within said handle in response to movement of said heat conducting member toward its retracted position *from its extended position*.

13. A curling iron according to claim 12, wherein said heat conducting member is a metallic tube and said electrical heat generating element is disposed within said tube.

14. A curling iron according to claim 12, further including hair gripping means pivotally mounted on said heat conducting member to longitudinally extend along said heat conducting member, said hair gripping means being arranged to move with said heat conducting member between said retracted position of said heat conducting member and said extended position of said heat conducting member.

15. A curling iron according to claim 12, wherein said automatic retracting means includes guide means having said plug means pivotally connected thereto and a guide means end fixedly attached to said heat conducting member, said guide means cooperating with means on said handle for guiding said heat conducting member between said retracted and extended positions and moving said plug means between said retracted plug position and said projecting plug position in response to said movement of said heat conducting member between said extended and retracted positions.

16. A curling iron comprising:

a hollow handle having an open end;

a heat conducting member secured to said handle and [for] arranged *for* reciprocal movement between a retracted position wherein said heat conducting member is substantially entirely enclosed within said handle and an extended position wherein said heat conducting member projects from said handle through said open end;

an electrical heat generating element associated with said heat conducting member for heating said heat conducting member;

electrical plug means *in said handle, said plug means being* electrically connected to said heat generating element and adapted to connect said heat generating element to [a ] *an external* source of power, said plug means being arranged for movement between a retracted position *substantially enclosed* within said handle and [a] *an extended* position projecting from said handle *for connection to an external power source* , said plug means [being] *arranged to be* in a retracted plug position wherein said plug means is substantially entirely within said handle when said heat conducting member is in its retracted position; and means for automatically moving said plug means from said retracted plug position to [an] *said* extended plug position wherein said plug means projects from said handle *for connection to an external power source* in response to movement of said heat conducting member toward its extended position.

17. A curling iron according to claim 16, wherein said heat conducting member is secured to said handle for telescopic movement between said extended position and said retracted position.

18. A curling iron according to claim 17, further including hair gripping means pivotally mounted on said heat conducting member to longitudinally extend along said heat conducting member.

19. A curling iron according to claim 18, further including an actuator arm member attached to said handle for pivotally moving said hair gripping means when pressed, said actuator arm member being arranged to cooperate with said plug means to move said plug means substantially entirely within said handle when said actuator arm member is pressed.

20. A curling iron according to claim 16, wherein said heat conducting member is a metallic tube and said electrical heat generating element is disposed within said tube.

21. A curling iron according to claim 16, wherein said means for moving said plug means from said retracted plug position to said extended plug position include guide means having said plug means pivotally connected thereto and a guide means end fixedly attached to said heat conducting member, said guide means cooperating with means on said handle for guiding said heat conducting member between said retracted and extended positions and moving said plug means between said retracted plug position and said extended plug position when said heat conducting member moves between said retracted position of said heat conducting member and said extended position of said heat conducting member.

22. A curling iron comprising:

a hollow handle having an open end;

a heat conducting member secured to said handle and arranged for telescopic movement between a retracted position within said handle and an extended position wherein said heat conducting member projects from said handle through said open end;

an electrical heat generating element associated with said heat conducting member for heating said heat conducting member;

movable electrical connector plug means *in said handle, said plug means being* electrically connected to said heat generating element for connecting said heat generating element to [a] *an external* power source; and means for automatically moving said plug means *in response to the telescopic movement of said heat conducting member from one of its retracted or extended positions to its other position* between a retracted plug position wherein said plug means is substantially entirely within said handle and an extended plug position wherein said plug means projects from said handle[, said movement being in response to said telescopic movement of said heat conducting member] *for connection to an external power source.*

23. A curling iron according to claim 22, wherein said heat conducting member is a metallic tube and said electrical heat generating element is disposed within said tube.

24. A curling iron according to claim 22, further including hair gripping means pivotally mounted on said heat conducting member to longitudinally extend along said heat conducting member.

25. A curling iron according to claim 22, further including an actuator arm member attached to said handle and cooperating with said plug means for causing said plug means to be substantially entirely retracted within said handle when said actuator arm member is pressed and said heat conducting member is moved toward its retracted position.

26. A curling iron according to claim 22, wherein said means for moving said plug means from said retracted plug position to said extended plug position include a guide member having said plug means pivotally connected thereto and an end of said guide member fixedly attached to said heat conducting member, said guide member cooperating with means on said handle for guiding said heat conducting member between said retracted and extended positions and moving said plug means between said retracted plug position and said extended plug position in response to movement of said heat conducting member.

* * * * *